United States Patent

Dreilich et al.

Patent Number: 5,443,133
Date of Patent: Aug. 22, 1995

[54] BRAKE SHOE WITH CHAMFERED LINING

[75] Inventors: Ludwig Dreilich, Bad Soden; Hans-Joachim Schmeling, Dieburg; Karl-Heinz Hach, Modau tal, all of Germany

[73] Assignee: ITT Automotive Europe GmbH, Frankfurt am Main, Germany

[21] Appl. No.: 301,048

[22] Filed: Sep. 6, 1994

Related U.S. Application Data

[63] Continuation of Ser. No. 934,616, Sep. 1, 1992, abandoned.

[30] Foreign Application Priority Data

Mar. 1, 1990 [DE] Germany .................. 40 06 369.0

[51] Int. Cl.$^6$ ............................................. F16D 69/00
[52] U.S. Cl. ............................. 188/250 G; 188/250 R
[58] Field of Search ............ 188/250 B, 250 G, 250 R, 188/73.1, 73.37, 24.22, 250 E, 257; 192/107 R, 107 T

[56] References Cited

U.S. PATENT DOCUMENTS 5,145,037  9/1992  Kobayashi et al. ............. 188/250 B

FOREIGN PATENT DOCUMENTS

| 2312690 | 12/1976 | France . |
| 2331476 | 6/1977 | France ................. 188/24.12 |
| 2712049 | 9/1977 | Germany . |
| 2314135 | 10/1978 | Germany . |
| 2919537 | 2/1980 | Germany . |
| 5139531 | 10/1980 | Japan ................. 188/250 G |
| 1239014 | 6/1986 | U.S.S.R. ............. 188/250 B |

*Primary Examiner*—Robert J. Oberleitner
*Assistant Examiner*—Lee W. Young
*Attorney, Agent, or Firm*—Robert P. Seitter; J. Gordon Lewis

[57] ABSTRACT

The invention is related to a brake shoe with a chamfered edge lining, the chamfered edge achieving desired surface configuration of the lining after only a few braking actions while increasing the service life of the lining. The chamfer has a profile shape which features a hyperbolic contour, steeply angled at the top adjacent the outer face and very shallowly angled at the bottom adjacent the backing plate so that the increment of wear of each braking operation decreases in a strongly degressive way.

11 Claims, 1 Drawing Sheet

BRAKE SHOE WITH CHAMFERED LINING

This is a continuation of application Ser. No. 07/934,616, filed on Sep. 1, 1992, now abandoned.

BACKGROUND OF THE INVENTION

In spot-type disc brakes, new replacement linings are subject during break in to an increased tendency to radial lift out. In many cases, this may be due to the brakes failing to meet the specified dimensional tolerances or because the linings are mismatched to the brakes utilized. The frictional forces in radial and tangential directions which result from the surface of the lining being urged in a nonuniform way against the brake disc have a substantial effect contributing to the lift-out tendency of the lining. This may even lead to not only the lining being lifted out against a stop, but also to the generation of substantial forces acting through the lining on the brake housing which tend to radially lift the latter out of its guide. In extreme cases this may lead to the housing being lifted up into a rotating surface of the wheel within which the brake is mounted.

Aberrations in the entrance and exit portions of the linings also tend to cause the lifting-out of the linings, particularly if the lining extends over a relatively large sectorial angle of the brake disc.

These problems are discussed in more detail in the German patent application published without examination, No. 2,517,109.

As a remedy, it is known to chamfer the linings in a top layer along the lateral edges in the tangential direction. As is explained in more detail in the German patent application published without examination, No. 2,314,135, such chamfers moreover counteract any tendency for the lining to assume a tilted position in respect to the brake disc.

It is also known according to the French patent application published without examination, No. 7,516,750 (publication No. 2,312,690) to chamfer the lower edge in a tangential direction for purposes of noise reduction.

It will be appreciated that in principle, it is desirable that a relatively small portion of the lining be ground off during, in order to as quickly as possible cause the lining to be abutted against the brake disc uniformly and at a correct angle, so as to have an increased service life.

It is therefore the object of the invention to extend the service life of the brake linings and to minimize the duration of the brake-in period.

SUMMARY OF THE INVENTION

The object of the invention is achieved by a brake lining shape having a chamfer of a particular profile formed on the edges of the lining. The chamfer profile is shaped in such a way that initially a very rapid degressive wear of the outer face of the lining is attained. In this context it will be advantageous that a fairly uniform surface of the lining is obtained after only a few braking actions so that succeeding portions of the chamfered layer present a rapidly increasing surface area of the outer face of the lining, which leads to an extension of the useful life of the linings. The chamfer profile is such as to be much steeper adjacent the outer face of the lining than adjacent the lining edge, so that during the initial braking actions, the increment of thickness of the lining which is ground off in each instance is relatively sizable as compared to the prior-art chamfered-type linings. A correction of the lining surface is thus attained rapidly, while the rate of thickness wear rapidly decreases as compared to the state-of-the-art chamfered-type linings during successive brake actuations. On the whole, a considerably reduced rate of wear results for the chamfered layer, so that the service life of the inventive brake shoe greatly increases.

A particularly advantageous shape of the chamfer profile is a hyperbolic curve which may be manufactured with ease.

A particular exponential equation describing the hyperbolic curve of the preferred chamfer profile is preferred. The chamfered edge preferably extends along both the circumferential and lateral edges of the lining.

One embodiment of the invention will be described in the following making reference to the accompanying drawing.

DETAILED DESCRIPTION

Figure 1:
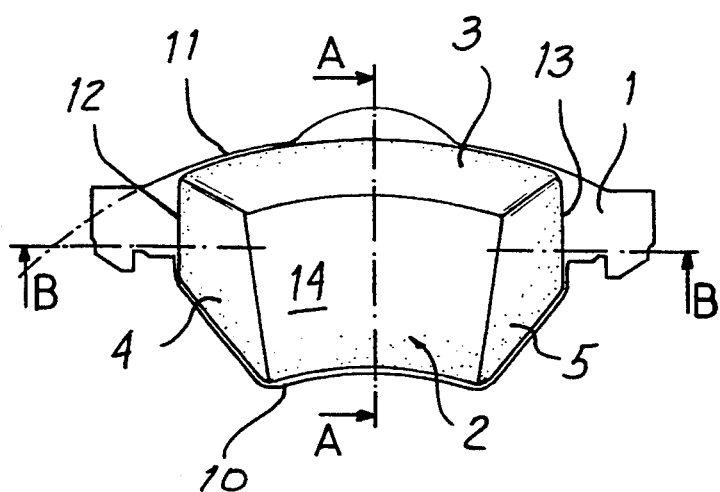
FIG. 1 shows a brake shoe with a lining being chamfered along three edges.

FIG. 1 shows a brake shoe 1 with a generally planar lining 2 having an inner face mounted on the back plate 9 and an outer face 14 facing away from the back plate 9. The lining 2 has radially spaced inner and outer circumferential edges 10, 11 and radially extending lateral edges 12, 13 been chamfered from the outer face 14 to the edges 11, 12, 13, forming two lateral radially extending contours 4 and 5 and an upper contour 3 extending in a circumferential direction.

Figure 2:
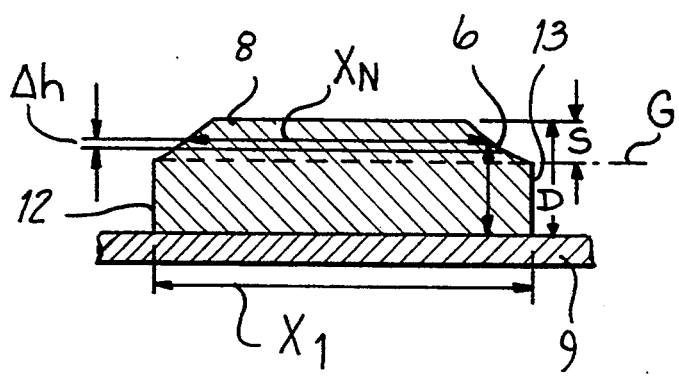
FIG. 2 shows a cross section through the brake shoe at the level of the line B—B in FIG. 1, the shading which denotes the cross section being omitted for the lining in the interest of clarity.

The profile 6 of the chamfer of the lateral contours 4, 5 can be seen in FIG. 2, this profile presenting a non-linearly curved hyperbolic shape. In FIG. 2, also the height of an increment of wear $\Delta h$ is indicated which results from the abrasion caused by a single braking cycle, and which jointly with the associated length $x_n$ and with the associated width $Z_n$, result in the volume of lining material being abraded with an individual braking procedure.

In the interest of a simplification of the conditions, it is assumed that for each equal force brake application, a fixed volume of liner material will be abraded from the lining by the brake disc. As compared to the prior-art linear chamfers, the contour, as far as the inventive chamfer is concerned, varies non-linearly or exponentially, and thus is steeply inclined adjacent the outer face 14. In an extreme case, the profile is vertical at the top of the chamfered layer 8. Whereas, at the bottom of the layer the profile 6 is inclined to a much lower degree adjacent the lining edge and in an extreme case it blends into a line which extends parallel to the back plate 9.

Accordingly, the height of increments of wear $\Delta h$ are very large at the top of the layer 8, whereas at the bottom of the layer 8 which runs along the dashed line G they are very small, assuming equal braking forces in each case.

Figure 3:
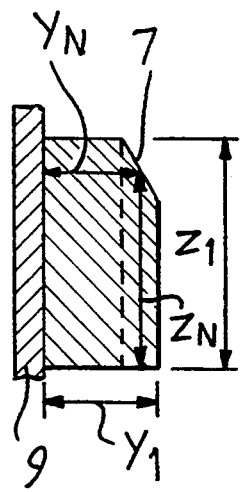
FIG. 3 shows a sectioned representation according to FIG. 2 along the line A—A in FIG. 1.

In an identical manner, FIG. 3 shows a cross section along the line A—A, in which again a profile 7 of the chamfer is shaped hyperbolically in the radial direction.

The hyperbolic shape of the profile 7 is one that is preferred in that it is easily manufactured.

The shape of the profile 6 of the chamfer contours 5 and 6 is given by the equation:

$$X_n = X_1 \cdot \frac{(D)^{-K}}{Y_n}$$

Where:

$X_n$ = the lining length of the surface of the said lining layer existing at any moment as measured along the center plane of said lining in a tangential direction, $X_1$ = the total length of the lining in a tangential direction, D = the total thickness of the lining prior to any wear as measured from the bottom of the lining, adjacent the back plate, $Y_n$ = the height of said lining at any moment, n = the number of braking actions carried out, and K = constant characteristic of said lining, as an index of wear, in which:

$K \geq $ ).

The shape of the profile 7 of the outer circumferential chamfer contour 3 is given by the equation:

$$Y_n = Y_1 \cdot \frac{(D)^{-K}}{Z_n}$$

D = the total thickness of the lining prior to any wear as measured from the bottom of the lining, adjacent the back plate, $Y_n$ = the height of said lining at any moment, $Y_1$ = the total height of the lining prior to any wear, $Z_n$ = the radial width of the lining at any moment, n = the number of braking actions carried out, and K = constant characteristic of said lining, as an index of wear, in which:

$K \geq 0$.

We claim:

1. A brake shoe for a disc brake, said brake shoe having a back plate and a generally planar lining having an inner face affixed against said back plate, and an outer face facing away from said backplate, said outer face defining a plane parallel to said back plate, said lining having radially lateral extending edges and circumferentially extending inner and outer edges, said lining chamfered along at least one of said radially lateral or circumferential edges of said lining;

said chamfer forming an inclined profile extending from said outer face to said at least one edge of said lining, said profile having a varying, non linear shape more steeply angled into said plane defined by said outer face of said lining adjacent said outer face than adjacent said at least one edge, whereby said chamfer shape causes the height of lining wear per braking action to rapidly decrease with successive braking actions.

2. A brake shoe as claimed in claim 1, wherein said shape of said profile of said chamfer follows a hyperbolic curve.

3. A brake shoe as claimed in claim 2, wherein said at least one chamfered edge of said lining comprises one of said circumferentially extending edges, and wherein said shape of said profile of said chamfer follows the equation;

$$X_n = X_1 \cdot \frac{(D)^{-K}}{Y_n},$$

in which:

$X_n$ = the length of the surface of said lining existing at any moment as measured along the center plane of said lining in a tangential direction, $X_1$ = the total length of the said lining in a tangential direction, D = the total thickness of said lining prior to any wear as measured from said inner face of said lining, adjacent said back plate, $Y_n$ = the height of said lining at any moment, n = the number of braking actions carried out, and K = constant characteristic of said lining, as an index of wear, in which:

$K \geq 0$.

4. A brake shoe as claimed in claim 1 wherein said lining lateral edges, and wherein said shape of said profile of said chamfer follows the equation:

$$Y_n = Y_1 \cdot \frac{(D)^{-K}}{Z_n}$$

in which:

$Y_n$ = the height of said lining at any moment,

D = the total thickness of said lining prior to any wear as measured from said inner face of said lining, adjacent said back plate, $Y_1$ = the total height of the lining prior to any wear, $Z_n$ = the radial width of said lining at any moment, n = the number of braking actions carried out, and K = constant characteristic of said lining, as an index of wear, in which:

$K \geq 0$.

5. A brake shoe as claimed in claim 3, wherein said at least one chamfered edge of said lining comprises said outer edge of said brake shoe lining.

6. A brake shoe as claimed in claim 3, wherein said lining lateral edges are also chamfered.

7. A disc brake shoe comprising a back plate, and a generally planar brake lining of a predetertermined thickness having an inner face mounted to said back plate, and an outer face facing away from said back plate, said outer face defining a plane parallel to said back plate, said lining having inner and outer radially spaced curved circumferential edges and radially extending lateral edges extending between said inner and outer circumferential edges, a chamfer extending about at least one of said lining edges, said chamfer extending partially across the thickness of said lining from said outer face of said lining to said edge of said lining, said chamfer having a profile shape in which the chamfer is much more steeply contoured into said plane defined by said outer face of said lining in regions thereof adjacent said outer face than in regions adjacent said lining edge, whereby increments of thickness worn away with each brake application greatly decrease with successive brake applications.

8. The brake shoe according to claim 7, wherein said chamfer profile shape is a non-linear curve.

9. The brake shoe according to claim 8 wherein said chamfer profile shape is exponential.

10. The brake shoe according to claim 9 wherein said chamfer profile shape comprises a hyperbolic curve.

11. The brake shoe according to claim 9 wherein said chamfer extends about the outer circumferential edge and the lateral edges of said lining.

* * * * *